United States Patent [19]

Jackson

[11] Patent Number: 4,636,770
[45] Date of Patent: Jan. 13, 1987

[54] DISPLAY TERMINAL

[75] Inventor: Paul H. Jackson, Winchester, United Kingdom

[73] Assignee: International Business Machines Corporation, Armonk, N.Y.

[21] Appl. No.: 586,608

[22] Filed: Mar. 6, 1984

[30] Foreign Application Priority Data

Mar. 31, 1983 [EP] European Pat. Off. ........ 83301869.0

[51] Int. Cl.⁴ ................................................ G08S 1/00
[52] U.S. Cl. ................................ 340/309.4; 340/309.5
[58] Field of Search ............. 340/309.4, 309.5, 309.15, 340/715; 364/473, 143

[56] References Cited

U.S. PATENT DOCUMENTS

| | | | |
|---|---|---|---|
| 3,778,809 | 12/1973 | Hawes | 340/309.5 |
| 3,820,105 | 6/1974 | Assmus | 340/309.5 |
| 3,916,090 | 10/1975 | Taibl | 178/4.1 |
| 4,062,007 | 12/1977 | Scott | 340/309.4 |
| 4,161,787 | 7/1979 | Groves et al. | 364/900 |
| 4,364,655 | 12/1982 | Parker | 340/309.4 |
| 4,400,699 | 8/1983 | Glasmacher | 340/309.4 |
| 4,463,416 | 7/1984 | Wood | 364/143 |

FOREIGN PATENT DOCUMENTS

2143791 3/1973 Fed. Rep. of Germany .

OTHER PUBLICATIONS

Electronic Design, vol. 25, No. 6, 15th Mar. 1977, pp. 10, 15, C. R. Allen: "If I Don't Simplify It, the Picture Will", whole article.

Primary Examiner—John W. Caldwell, Sr.
Assistant Examiner—Michael F. Heim
Attorney, Agent, or Firm—Frederick D. Poag

[57] ABSTRACT

In a display terminal coupled to a computer and including a plurality of user interrupt devices for interactive communication with the computer, an apparatus for signalling to the user when the computer responds to a user interrupt comprises a counter arranged to measure a specified period of time by counting down to zero from an initial count value loaded from a register, a sensor triggered by the generation of an interrupt to cause the counter to begin measurement of the said specified period of time, and a further sensr coupled to an alarm via a logic gate to provide an audible signal only when the period of time between the generation of the interrupt and the computer response exceeds the specified period of time measured by the counter.

3 Claims, 1 Drawing Figure

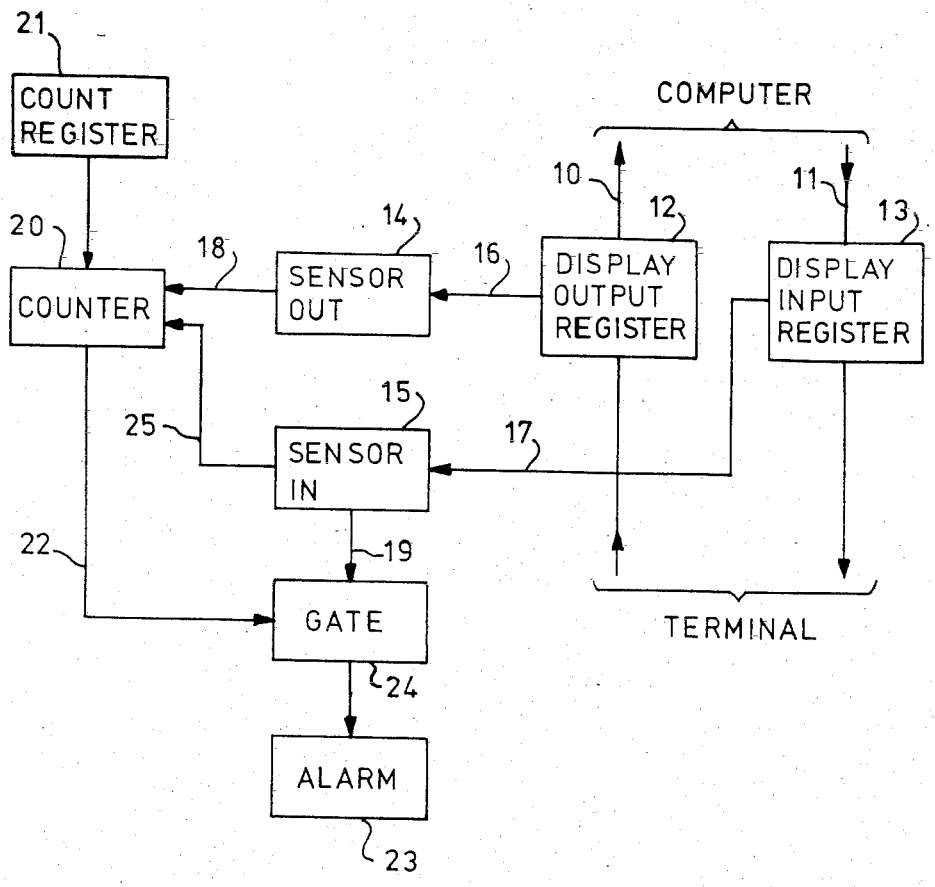

DISPLAY TERMINAL

This invention relates to a display terminal which is coupled to a computer and which includes a plurality of user interrupt devices, such as keys on a keyboard, for interactive communication with the computer.

When a user is interacting with a computer via a display terminal, the user must normally look at the terminal to see when the computer has responded to a request, unless the program running specifically sounds an audible alarm which is usual only for error messages. While this is acceptable when the computer response time to a user interrupt is short, for example less than two seconds, many applications involve both long and short response times with the user often having no prior knowledge of the response time in any particular case.

In interactive image processing, for example, response times can vary from less than one second to several minutes, and the same is true of some data base query systems and graphics systems. In such cases, when the computer response time is long, the user is constantly having to glance at the terminal to determine when the response to his interrupt has been returned from the computer. He cannot meanwhile concentrate on other work, and this leads to irritation and stress over a period of time.

Accordingly, in a display terminal coupled to a computer and including a plurality of user interrupt devices for interactive communication with the computer, the invention provides an apparatus for signalling to the user when the computer responds to a user interrupt, the apparatus being characterised by a timer arranged to measure a specified period of time, means triggered by the generation of an interrupt to cause the timer to begin measurement of the said specified period of time, and means triggered by a computer response to the interrupt to provide an audible signal only when the period of time between the generation of the interrupt and the computer response exceeds the specified period of time measured by the timer.

The invention thus provides a way of signalling to the user when the computer is responding after a long interval, but not after a short interval as defined by the period of time specified by the timer. The absence of an audible signal if the response is received within the short interval ensures that the user is not irritated by a succession of audible signals when the computer issues a series of rapid responses and the user's attention has not drifted from the job in hand. However, for a long interval (say more than 20 seconds) the user will probably wish to look away and work on some other task from which he can be interrupt later, and the present invention permits him to do this in the knowledge that the display terminal will sound an audible alarm when the computer responds. The user is thus relieved of the need to stare at the display screen or keep glancing at it, avoiding the attendant disadvantages of irritation, lack of concentration and stress.

In an embodiment of the invention the timer comprises a counter which is set to an initial specified value by the actuation of an interrupt device and which thereafter automatically counts to a second specified value, and wherein the audible signal is provided only when a computer response occurs after the timer has reached the second count value.

Furthermore, in order to prevent repeated sounding of the audible signal by a rapid succession of computer responses (e.g. write operations) which occur after the counter has reached the second count value but in reply to only a single original interrupt, the counter is preferably reset to the initial value by each such response. Thus each successive response will only provide the audible signal if it follows the previous response after a period which exceeds the specified period measured by the counter.

The user interrupt devices are typically keys on a keyboard, but they may include other display peripherals such as a tablet, valuators or the like. As a refinement, the period of time specified by the timer may be settable by the user.

An embodiment of the invention will now be described, by way of example, with reference to the accompanying block circuit diagram.

In the diagram the display terminal and computer are not shown, but they are assumed to communicate via lines 10 and 11, the former constituting the path for data from the terminal to the computer and the latter constituting the path for data in the return direction. It is to be understood that each line 10 and 11 may represent a single line or a plurality of parallel lines depending upon whether the data transfer is serial or parallel. Each line 10 and 11 includes a respective register 12,13 for temporary buffering of the data in each direction, the register 12 being the data output register (DOR) and the register 13 being the data input register (DIR). The registers 12 and 13 hold the information in parallel form. Registers such as the DOR 12 and the DIR 13 commonly form a part of the interface between a computer and a display terminal and may therefore be regarded as conventional items.

Respective sensors 14 and 15 monitor the information content of the registers 12 and 13 over the lines 16 and 17 respectively, and each is arranged to provide an output signal in the form of a short pulse on a respective line 18 and 19 when the data changes. Each sensor 14 and 15 may, for example, comprise an OR gate having a plurality of parallel inputs each connected to a respective bit position of its associated register 12 or 13, the lines 16 and 17 therefore actually consisting of a plurality of parallel lines. The output of each OR gate will go high when the information in the associated DOR 12 or DIR 13 is modified, and this rise at the output of the OR gate may be used to generate the short pulse referred to above, for example using a monostable multivibrator.

The output line 18 of the sensor 14 is connected to a counter 20 which, upon receipt of a pulse from the sensor 14, is loaded (set) to an initial or first count value held in a count register 21. The counter 20 thereafter immediately and automatically begins to count down to a second count value of zero at a rate determined by an internal clock (not shown). When the counter reaches zero it provides an output signal on a line 22.

The output line 19 of the sensor 15 is connected to an audible alarm circuit 23 via a logic gate 24. The gate 24, which may be an AND gate, is normally closed to signals on the line 19 but is enabled by the presence of a signal on the line 22. The alarm circuit 23 responds to a pulse from the sensor 15 by providing a short audible "buzz", "beep" or other desired sound.

The above circuit operates as follows. When a terminal interrupt key or other interrupt device is pressed or actuated by the terminal user the data in the DOR 12 changes. This change is detected by the sensor 14 and the short pulse thereby provided on the line 18 loads the counter 20 from the register 21. The counter 20 then immediately and automatically counts down to zero.

When the computer responds to the interrupt this is detected by the sensor 15 as a change in the data in DIR 13, and the sensor 15 thus provides a pulse on the line 19. However, this pulse will be blocked by the AND gate 24 unless a signal is also present on the counter output line 22. The effect is therefore than an audible signal will be provided only if the computer response, as reflected by a change of information in DIR 13, occurs after the counter has counted down to zero. The initial count held in the register 21 together with the frequency of the internal clock of the counter 20 will determine how long this period of time is, and the initial count value specified by the register 21 will therefore be chosen to provide a suitable period for the user, for example 20 seconds. Clearly it is advantageous to permit this time period to be specified by the user, and thus the initial count value in the register 21 is preferably adjustable manually or under program control. It may also be desirable to selectively disable the apparatus at times, and this could be readily accomplished.

It will be noted that in addition to the line 19 the sensor 15 also has a further output line 25. This line 25 provides precisely the same short pulse as the line 19 but it is applied instead to the counter 20. The latter responds to this pulse in the same way as it responds to a pulse on the line 18 from the sensor 14; i.e. the counter is loaded with the initial count value held in the register 21 and automatically counts down to zero.

The reason for this further output 25 is to prevent repeated sounding of the alarm 23 by a rapid succession of computer responses (e.g. write operations) which occur after the counter 20 has reached zero but in reply to only a single original interrupt. In such a situation it will be observed that the gate 24 would normally be permanently enabled by the line 22 so that each change in the DIR 13 will result in an audible signal. The line 25 thus provides that the counter 20 is reset to the initial count value after each successive computer response so that the latter will only sound the alarm if it follows the previous response by more than the time period defined by the initial count value held in the register 21.

Since the signal on the counter output line 22 is removed when the counter is reset it is essential to ensure that the resetting of the counter via the pulse on the line 25 occurs slightly after the corresponding pulse on the line 19 has passed the gate 24, since otherwise the alarm 23 might be inhibited even for the first computer response following the interrupt. For this purpose the pulse on the line 25 may be subject to a slight extra delay if necessary, although it is expected that normal circuit delays will be sufficient to provide the required sequence of operations.

It is to be noted that on some terminals every key is an interrupt key. However, this makes no difference to the above apparatus. For example, in the case of the user pressing the keys: Y, E, S, (ENTER), the computer will usually not write to the display until after the (ENTER) key is pressed. It therefore does not matter that the Y, E and S keys caused the counter 20 to be set when each was pressed since the interrupt of interest, the pressing of the (ENTER) key, will effect the final setting of the counter and the timing will begin at that point.

It is further to be noted that terminals which have a "clicker" feature, such as the IBM 3270 series, can conveniently use this in place of or as the final audible output of the alarm 23.

I claim:

1. In a display terminal coupled to a computer and including a plurality of devices for interactive communication with the computer, said devices including means for signalling a user interrupt to said computer, an apparatus for signalling to the user when the computer responds to a user interrupt, the apparatus comprising a timer arranged to measure a specified period of time, means triggered by the generation of an interrupt to cause the timer to begin measurement of the said specified period of time, and means triggered by a computer response to the interrupt to provide an audible signal only when the period of time between the generation of the interrupt and the computer response exceeds the specified period of time measured by the timer.

2. An apparatus as claimed in claim 1, wherein the timer comprises a counter which is set initially to a first specified value by the actuation of an interrupt device and which thereafter automatically counts to a second specified value, and wherein the audible signal is provided only when a computer response occurs after the counter has reached the second count value.

3. An apparatus as claimed in claim 2, wherein the counter is reset to the first specified value by each computer response when a plurality of such responses follow a single interrupt.

* * * * *